Aug. 18, 1931.      C. B. PARSONS      1,819,967
LOADING BLOCK
Filed Feb. 24, 1928
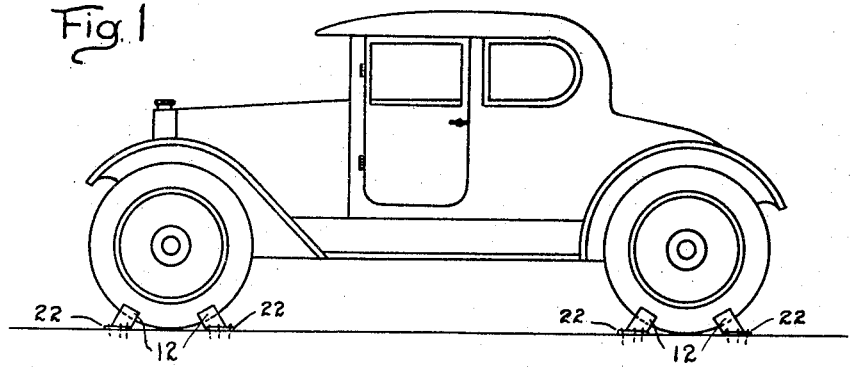
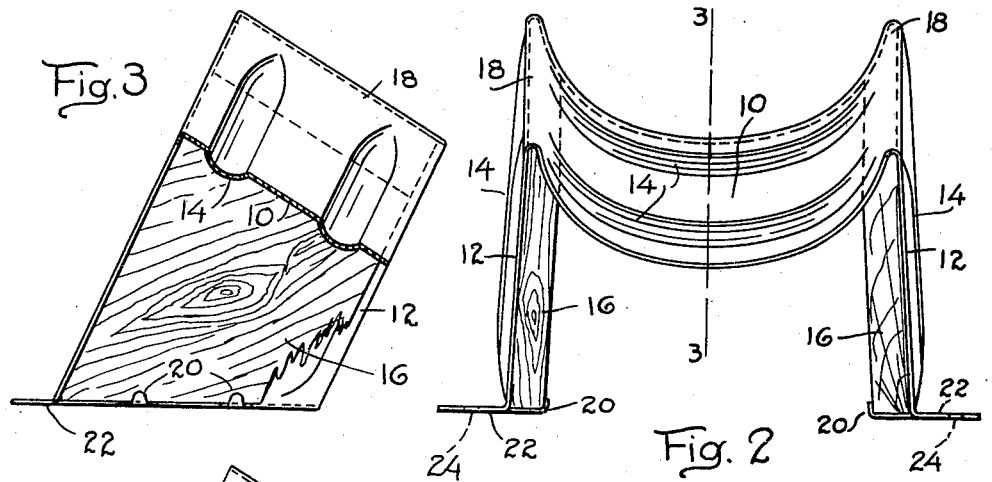
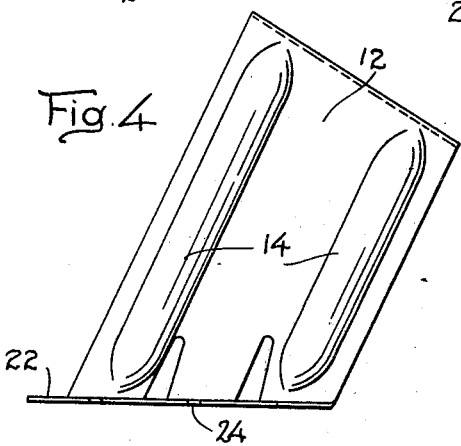
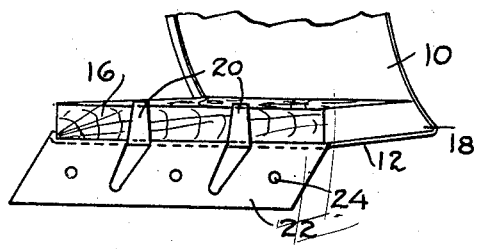
INVENTOR
Carl B. Parsons
BY
Parker & Burton
ATTORNEYS.

Patented Aug. 18, 1931

1,819,967

UNITED STATES PATENT OFFICE

CARL B. PARSONS, OF DETROIT, MICHIGAN

LOADING BLOCK

Application filed February 24, 1928. Serial No. 256,520.

My invention relates to an improved vehicle wheel chock which is particularly adapted for use as a loading block in the shipment of automobiles.

An object is to provide a loading block of the character described made almost entirely of light weight sheet metal of an inexpensive character having legs reinforced in a novel manner, which chock is of a strong and sturdy construction yet light in weight and inexpensive in price.

A meritorious feature resides in the provision of a chock of this type wherein a reinforcing member is provided adjacent to the inside of each leg which is held in place in a novel manner thereagainst.

Other advantageous features of my invention will appear from the following description, appended claims and accompanying drawings wherein,—

Fig. 1 is a diagrammatic view showing a vehicle in side elevation supported by my improved block.

Fig. 2 is a end elevation of my improved block.

Fig 3 is a vertical sectional view taken on line 3—3 of Fig. 2.

Fig. 4 is a side elevation of my improved block.

Fig. 5 is a foot plan view of a fragment thereof from the underside.

I have shown in Fig. 1 a pair of blocks arranged on opposite sides of the front and rear road wheels of a motor vehicle. As shown in the other figures of the drawings this block is formed almost entirely of light weight sheet metal which is so shaped as to provide an arcuate portion 10 adapted to embrace the tire of the wheel and having downwardly turned end or leg portions 12 arranged on opposite sides.

I have shown the structure as provided with longitudinally extending stiffening corrugations 14. The legs extend rearwardly obliquely so as to effectively carry the load strain and the opposed upright edges thereof are substantially perpendicular to the axis of the arcuate tire engaging portion. The structure is made of very light sheet metal and each leg is reinforced with a substantially rigid member 16. These members 16 are here shown as formed of wood. They are so shaped as to seat at their upper edge within the groove formed at the juncture 18 of each leg with the arcuate portion and bear directly at such upper edge against the arcuate portion to carry the load thereof. It will be seen that the upper portion of the member 16 is gripped securely between the arcuate portion and the leg portion at the juncture thereof.

This member 16 is held in place by tongues 20 which are punched from the leg portions 12 and bent underneath and over the lower edge of the member 16. Each leg portion is shown as bent outwardly at its lower edge forming a foot 22 perforated at 24 to receive nails or other fastening means and in Fig. 5 these tongues are shown as punched from these foot parts. In the other figures of the drawings the tongues are shown as punched from the lower side portions of the legs adjacent to the feet thereof.

Obviously the members 16 might be formed of material other than wood such as metal or concrete.

What I claim is:

1. A loading block formed of sheet metal bent to provide an arcuate portion shaped to embrace the periphery of a wheel and having leg portions bent downwardly on each side therefrom and a reinforcing member positioned upon the inside of each leg portion bearing directly against the arcuate portion at the juncture of the leg therewith and secured to said leg portion.

2. A loading block formed of sheet metal bent to provide an arcuate portion shaped to embrace the periphery of a wheel and having leg portions bent downwardly on each side therefrom and a reinforcing member positioned upon the inside of each leg portion bearing directly against the arcuate portion at the juncture of the leg therewith and held against the leg portion at its upper end thereby and secured to the leg portion at its lower end by tongues punched from the leg portion and turned over the lower edge of said reinforcing member.

3. A loading block formed of sheet metal bent to provide an arcuate portion shaped to embrace the periphery of a wheel and having leg portions bent downwardly on each side therefrom, each leg portion being bent outwardly at its lower end forming a foot, a reinforcing member arranged upon the inside of each leg portion bearing at its upper end directly against the arcuate portion at the juncture of the leg therewith and held against the leg at such upper end by said arcuate portion and tongues punched from each foot and bent inwardly and upwardly above the lower end of the adjacent reinforcing member securing said lower end to the adjacent leg portion.

4. A loading block formed of sheet material bent to provide an arcuate load supporting portion and having legs corresponding in width to the width of the arcuate supporting portion bent downwardly at each extremity thereof, and a reinforcing member positioned upon the inside of each leg bearing directly against the arcuate portion at the juncture of each leg therewith, said reinforcing members being secured to said legs.

5. In combination with a loading block constructed of sheet material and having an arcuate shaped load supporting central portion, legs corresponding in width to that of said arcuate shaped portion secured to each extremity of said portion and adapted to lie in a plane substantially vertical to that of a given supporting surface, and reinforcing elements secured along the inside face of each of said legs bearing directly against the outer extremities of the arcuate shaped portion at its juncture with the legs, the upper extremities of said reinforcing elements being concaved on their inner face to form a positive seat for a substantially small outer portion of each extremity of said arcuate shaped load supporting portion.

In testimony whereof, I, CARL B. PARSONS, sign this specification.

CARL B. PARSONS.